United States Patent
Gareiss et al.

Patent Number: 5,434,209
Date of Patent: Jul. 18, 1995

[54] FLAMEPROOFED THERMOPLASTIC POLYAMIDE MOLDING MATERIALS

[75] Inventors: Brigitte Gareiss, Ludwigshafen; Petra Baierweck, Boehl-Iggelheim, both of Germany

[73] Assignee: BASF Aktiengesellschaft, Ludwigshafen, Germany

[21] Appl. No.: 160,177

[22] Filed: Dec. 2, 1993

Related U.S. Application Data

[63] Continuation-in-part of Ser. No. 91,088, Jul. 14, 1993, abandoned, which is a continuation of Ser. No. 904,923, Jun. 26, 1992, abandoned.

[30] Foreign Application Priority Data

Jun. 27, 1991 [DE] Germany .................. 41 21 261.4

[51] Int. Cl.⁶ .............................................. C08K 5/13
[52] U.S. Cl. ........................................ 524/352; 524/80; 524/340; 524/353
[58] Field of Search .................. 524/80, 345, 352, 353

[56] References Cited

U.S. PATENT DOCUMENTS

| | | | |
|---|---|---|---|
| 4,616,053 | 10/1986 | Schultz et al. | 524/352 |
| 4,628,069 | 12/1986 | Meyer et al. | |
| 4,745,146 | 5/1988 | Meyer et al. | |
| 5,049,599 | 9/1991 | Steiert et al. | 524/80 |
| 5,260,359 | 11/1993 | Muehlbach et al. | 524/80 |

FOREIGN PATENT DOCUMENTS

| | | |
|---|---|---|
| 112542 | 7/1984 | European Pat. Off. |
| 224847 | 6/1987 | European Pat. Off. |
| 240887 | 10/1987 | European Pat. Off. |
| 0225901 | 2/1988 | European Pat. Off. |
| 3900460 | 7/1990 | Germany |

Primary Examiner—Veronica P. Hoke
Attorney, Agent, or Firm—Keil & Weinkauf

[57] ABSTRACT

Flameproofed thermoplastic molding materials contain
A) 30–98% by weight of a thermoplastic polyamide,
B) 1–30% by weight of Red phosphorus,
C) 1–15% by weight of a mono- or diphenolic compound or of a mixture thereof,
D) 0–60% by weight of a fibrous or particulate filler or of a mixture thereof and
E) 0–30% by weight of an elastomeric polymer.

8 Claims, 1 Drawing Sheet

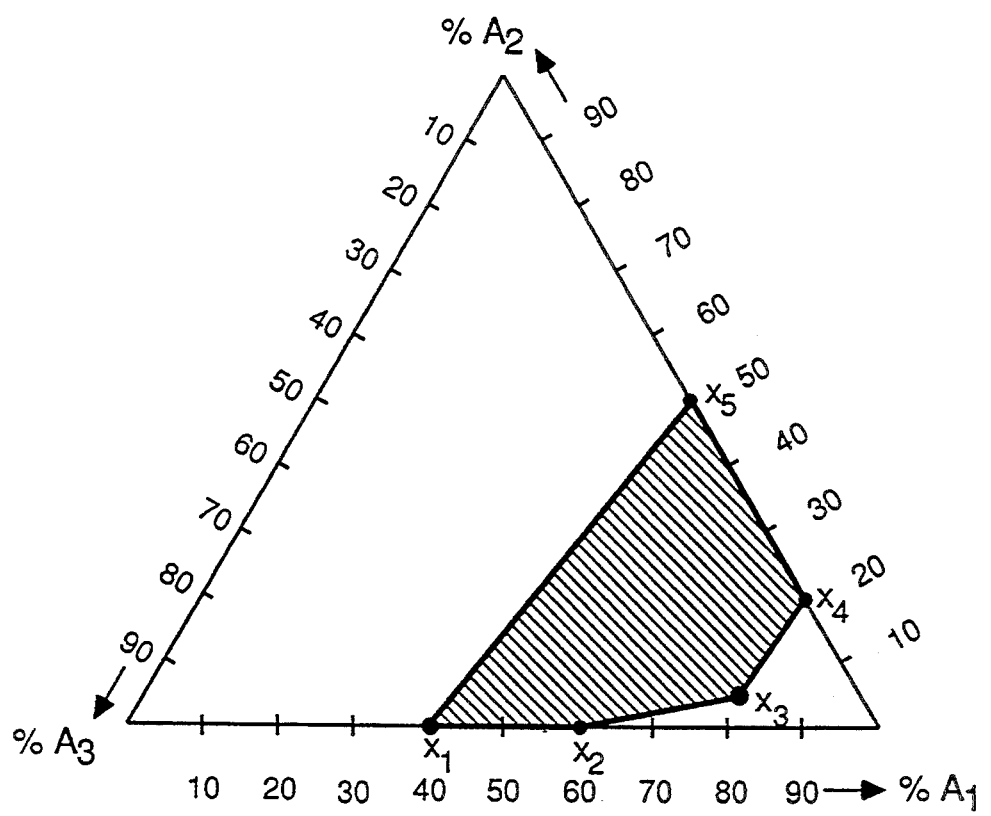

FLAMEPROOFED THERMOPLASTIC POLYAMIDE MOLDING MATERIALS

This application is a continuation-in-part of Ser. No. 08/091,088, filed Jul. 14, 1993, abandoned, which is a continuation of Ser. No. 07/904,923, filed Jun. 26, 1992, abandoned.

The present invention relates to flameproofed thermoplastic molding materials containing A) 30–98% by weight of a thermoplastic polyamide,
B) 1–30% by weight of phosphorus,
C) 1–15% by weight of a mono- or diphenolic compound or of a mixture thereof,
D) 0–60% by weight of a fibrous or particulate filler or of a mixture thereof and
E) 0–30% by weight of an elastomeric polymer.

The present invention furthermore relates to the use of such flameproofed thermoplastic molding materials for the production of fibers, films and moldings and to the moldings obtainable from the novel molding materials.

EP-A 224 847, EP-A 240 887 and EP-A 112 542 disclose polyamide molding materials which contain mono- or diphenolic compounds.

According to these publications, these polyamide molding materials have improved properties, in particular with respect to flow, reduced water absorption and toughness, when mono- or diphenolic compounds are reacted. However, these applications make no mention of the flame-proofing of such polyamide molding materials.

It is an object of the present invention to provide flameproofed thermoplastic polyamide molding materials which have good fire behavior and in particular high phosphorus stability.

We have found that this object is achieved by the molding materials defined at the outset.

Preferred molding materials of this type and their use are described in the subclaims.

The novel molding materials contain, as component A), from 30 to 98, preferably from 40 to 97, in particular from 40 to 96%, by weight of a thermoplastic polyamide.

The polyamides of the novel molding materials generally have a relative viscosity $\eta_{rel}$ of from 1.7 to 5.0, determined in a 1% strength by weight solution in 96% strength by weight sulfuric acid at 25° C., which corresponds to a K value (according to Fikentscher) of from 50 to 96. Polyamides having a relative viscosity of from 2.3 to 4.5, in particular from 2.5 to 4.0, are preferably used.

Semicrystalline and amorphous resins having a weight average molecular weight of at least 5,000, as described, for example, in U.S. Pat. Nos. 2,071,250, 2,071,251, 2,130,523, 2,130,948, 2,241,322, 2,312,966, 2,512,606 and 3,393,210, are preferred.

Examples of these are polyamides which are derived from lactams having from 7 to 13 ring members, such as polycaprolactam, polycapryllactam and polylaurolactam, and polyamides which are obtained by reacting dicarboxylic acids with diamines.

Suitable dicarboxylic acids are alkanedicarboxylic acids of 6 to 12, in particular 6 to 10, carbon atoms and aromatic dicarboxylic acids. Only adipic acid, azelaic acid, sebacic acid, dodecanedioic acid and terephthalic and/or isophthalic acid are mentioned here as acids.

Particularly suitable diamines are alkanediamines of 6 to 12, in particular 6 to 8, carbon atoms and m-xylylenediamine, di-(4-aminophenyl)-methane, di-(4-amino-cyclohexyl)-methane, 2,2-di-(4-aminophenyl)-propane and 2,2-di-(4-aminocyclohexyl)-propane.

Preferred polyamides are polyhexamethyleneadipamide, polyhexamethylenesebacamide and polycaprolactam.

Polyamides which are obtainable, for example, by condensation of 1,4-diaminobutane with adipic acid at elevated temperatures (nylon 4,6) may also be mentioned. Preparation processes for polyamides having this structure are described in, for example, EP-A 38 094, EP-A 38 582 and EP-A 39 524.

Polyamides which are obtainable by copolymerizing two or more of the abovementioned monomers, or mixtures of a plurality of polyamides, are also suitable, any mixing ratio being possible.

The novel thermoplastic molding materials contain, as preferred component A), partly aromatic, semi-crystalline copolyamides composed of $A_1$) 20–90% by weight of units which are derived from terephthalic acid and hexamethylenediamine,
$A_2$) 0–50% by weight of units which are derived from $\epsilon$-caprolactam,
$A_3$) 0–80% by weight of units which are derived from adipic acid and hexamethylenediamine and
$A_4$) 0–40% by weight of further polyamide-forming monomers, the amounts of component ($A_2$) or ($A_3$) or ($A_4$) or of mixtures thereof being at least 10% by weight.

Component $A_1$) contains 20–90% by weight of units which are derived from terephthalic acid and hexamethylenediamine.

In addition to the units which are derived from terephthalic acid and hexamethylenediamine, the copolyamides contain units which are derived from $\epsilon$-caprolactam and/or units which are derived from adipic acid and hexamethylenediamine and/or units which are derived from further polyamide-forming monomers.

The amount of units which are derived from $\epsilon$-caprolactam is not more than 50, preferably from 20 to 50, in particular from 25 to 40, % by weight, while the amount of units which are derived from adipic acid and hexamethylenediamine is up to 80, preferably from 30 to 75, in particular from 35 to 60, % by weight.

The copolyamides may also contain both units of $\epsilon$-caprolactam and units of adipic acid and hexamethylenediamine; in this case, it is advantageous if the amount of units which are free of aromatic groups is at least 10, preferably at least 20, % by weight. The ratio of the units which are derived from $\epsilon$-caprolactam to those which are derived from adipic acid and hexamethyenediaminediamine is not subject to any particular restriction.

DESCRIPTION OF DRAWING

Preferred copolyamides are those whose composition in the ternary diagram is within the pentagon established by the apices $X_1$ to $X_5$, which are defined as follows:

| | |
|---|---|
| $X_1$ | 40% by weight of units $A_1$) |
| | 60% by weight of units $A_3$) |
| $X_2$ | 60% by weight of units $A_1$) |
| | 40% by weight of units $A_3$) |
| $X_3$ | 80% by weight of units $A_1$) |
| | 5% by weight of units $A_2$) |

|   | |
|---|---|
|   | 15% by weight of units $A_3$) |
| $X_4$ | 80% by weight of units $A_1$) |
|   | 20% by weight of units $A_2$) |
| $X_5$ | 50% by weight of units $A_1$) |
|   | 50% by weight of units $A_2$) |

In the FIGURE, the pentagon established by these points is shown in a ternary diagram.

Polyamides containing from 50 to 80, in particular from 60 to 75, % by weight of units which are derived from terephthalic acid and hexamethylenediamine (units $A_1$) and from 20 to 50, preferably from 25 to 40, % by weight of units which are derived from ε-caprolactam (units $A_2$) have proven particularly advantageous for many intended uses.

In addition to the units A1) to A3) described above, the partly aromatic copolyamides may contain up to 40, preferably 10–30, in particular 20–30, % by weight of further polyamide-forming monomers $A_4$), as are known for other polyamides.

Aromatic dicarboxylic acids $A_4$) have from 8 to 16 carbon atoms. Examples of suitable aromatic dicarboxylic acids are isophthalic acid, substituted terephthalic and isophthalic acids, such as 3-tert-butylisophthalic acid, and polynuclear dicarboxylic acids, e.g. 4,4'- and 3,3'-diphenyldicarboxylic acid, 4,4'- and 3,3'-diphenylmethanedicarboxylic acid, 4,4'- and 3,3'-phenylsulfonylphenyldicarboxylic acid, 1,4- and 2,6-naphthalenedicarboxylic acid and phenoxyterephthalic acid, isophthalic acid being particularly preferred.

Further polyamide-forming monomers $A_4$) may be derived from dicarboxylic acids of 4 to 16 carbon atoms and aliphatic or cycloaliphatic diamines of 4 to 16 carbon atoms and from aminocarboxylic acids or corresponding lactams of 7 to 12 carbon atoms. As a few examples of suitable monomers of this type, suberic acid, azelaic acid and sebacic acid may be mentioned as typical aliphatic dicarboxylic acids, 1,4-butanediamine, 1,5-pentanediamine, piperazine, 4,4'-diaminodicyclohexylmethane, 2,2-(4,4'-diaminodicyclohexyl)-propane and 3,3'-dimethyl-4,4'-diaminodicyclohexylmethane may be mentioned as typical diamines and capryllactam, enantholactam, ω-aminoundecanoic acid and laurolactam may be mentioned as typical lactams and aminocarboxylic acids, respectively.

The following compositions of component (A) are particularly preferred:

$A_1$) from 65 to 85% by weight of units which are derived from terephthalic acid and hexamethylenediamine and $A_4$) from 15 to 35% by weight of units which are derived from isophthalic acid and hexamethylenediamine or $A_1$) from 50 to 70% by weight of units which are derived from terephthalic acid and hexamethylenediamine and $A_3$) from 10 to 20% by weight of units which are derived from adipic acid and hexamethylenediamine and $A_4$) from 20 to 30% by weight of units which are derived from isophthalic acid and hexamethylenediamine.

If component ($A_4$) contains symmetric dicarboxylic acids in which the carboxyl groups are in the para-position, it is advisable to react these with ($A_1$) and ($A_2$) or ($A_1$) and ($A_3$) to give ternary copolyamides, since otherwise the copolyamide has too high a melting point and melts only with decomposition, which is undesirable.

Partly aromatic copolyamides whose triamine content is less than 0.5, preferably less than 0.3, % by weight have also proven particularly advantageous.

Partly aromatic copolyamides prepared by most known processes (cf. U.S. Pat. No. 4,603,166) have triamine contents greater than 0.5% by weight, which leads to a deterioration in the product quality and to problems in the continuous preparation. The triamine which causes these problems is in particular dihexamethylenetriamine, which is formed from the hexamethylenediamine used in the preparation.

Copolyamides having a low triamine content have the same solution viscosity but lower melt vicosities than products of the same composition which have a higher triamine content. This considerably improves both the processibility and product properties.

The melting points of the partly aromatic copolyamides are from 270° to 325° C., preferably from 280° to 310° C., this high melting point also being associated with a high glass transition temperature of, as a rule, more than 75° C., in particular more than 85° C. (in the dry state).

Binary copolyamides based on terephthalic acid, hexamethylenediamine and ε-caprolactam and containing about 70% by weight of units which are derived from terephthalic acid and hexamethylenediamine have melting points of about 300° C. and (in the dry state) a glass transition temperature of more than 110° C.

Binary copolyamides based on terephthalic acid, adipic acid and hexamethylenediamine and having lower contents of about 55% by weight of units of terephthalic acid and hexamethylenediamine (HMD) have melting points of 300° C. or more, the glass transition temperature being not quite as high as in the case of binary copolyamides which contain ε-caprolactam instead of adipic acid or adipic acid/HMD.

According to the invention, the partly aromatic copolyamides should be understood as being those which have a crystallinity of >10%, preferably >15%, in particular >20%.

The crystallinity is a measure of the proportion of crystalline fragments in the copolyamide and is determined by X-ray diffraction.

The preparation of the preferred partly aromatic copolyamides having a low triamine content can be carried out by the processes described in EP-A 129 195 and 129 196.

The novel molding materials contain, as component (B), from 1 to 30, preferably from 1 to 20, in particular from 2 to 10, % by weight of red or black phosphorus.

Particularly in combination with glass fiber-reinforced molding materials, a preferred flameproofing agent (B) is elemental red phosphorus, which can be used in untreated form.

However, formulations in which the phosphorus is coated on the surface with low molecular weight liquid substances, such as silicone oil, liquid paraffin or esters of phthalic acid or adipic acid or with polymeric or oligomeric compounds, for example with phenolic resins or aminoplasts and polyurethanes, are particularly suitable.

Masterbatches of red phosphorus, for example in a polyamide or an elastomer, are also suitable as the flameproofing agents. Polyolefin homo- and copolymers are particularly suitable as masterbatch polymers.

However, the amount of the masterbatch polymer should not be more than 35% by weight, based on the weight of components (A) and (B), in the novel molding materials.

The median particle size ($d_{50}$) of the phosphorus particles distributed in the molding materials is preferably from 0.0001 to 0.5 mm, in particular from 0.001 to 0.2 mm.

The content of component B) in the novel molding materials is from 1 to 30, preferably from 2 to 20, in particular from 2 to 10, % by weight, based on the sum of components A) to C).

The novel molding materials contain, as component C), from 1 to 15, preferably from 1 to 12, in particular from 2 to 8, % by weight of a mono- or diphenolic compound or a mixture thereof.

Suitable monophenols C) of at least 10 carbon atoms are those of the general formula I

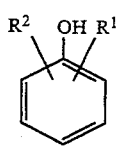

where $R^1$ and $R^2$ are identical or different and are each hydrogen, $C_1$–$C_{16}$-alkyl, $C_6$–$C_{18}$-aryl or $C_7$–$C_{20}$-aralkyl and each of the radicals may be substituted by at least one $C_1$–$C_{12}$-alkyl group or one halogen atom and the aryl radical may be bonded via —O—, -$C_1$–$C_3$-alkylene- or —$SO_2$— bridge members, or $R^1$ and $R^2$ are bonded to one another to form an aromatic or cycloaliphatic carbocyclic ring of 5 to 12 atoms, with the proviso that both radicals $R^1$ and $R^2$ are not ortho to the phenolic OH group.

Relatively high molecular weight or long-chain phenols having more than 10 carbon atoms, such as monophenols of 10 to 22 carbon atoms which are monosubstituted or polysubstituted by $C_1$–$C_{12}$-alkyl and/or $C_7$–$C_{15}$-aralkyl and which may be substituted in not more than one ortho-position with respect to the OH group, or hydroxydi- or triphenyls which are unsubstituted or substituted by at least one $C_1$–$C_6$-alkyl group and whose rings may be bonded via —O—, -$C_1$–$C_3$-alkylene- or —$SO_2$— bridge members and which may be substituted in not more than one ortho-position with respect to the OH group, are particularly preferred.

Examples are the following monophenolic compounds I: tetrahydronaphthol, 2-butylphenol (sec and tert), 4-tert-butylphenol, thymol, 4-tert-pentylphenol, octylphenol (mixture), nonylphenol (mixture), dodecylphenol (mixture), 4-hydroxybiphenyl, 2-hydroxybiphenyl, alkyl-substituted hydroxybiphenyls as described in, for example, German Laid-Open Application DOS 1,943,230, 1-naphthol, 2-naphthol, benzylphenol(s), benzylcresol(s), 2-phenyl-2-(4-hydroxyphenyl)-propane, 4-hydroxydiphenyl sulfone, 4-hydroxydiphenyl ether, 2- and 4-cyclohexylphenols and mixtures thereof, 4-tertbutylphenol being particularly preferred.

According to the invention, component C) is to be understood as meaning diphenols of the general formula II

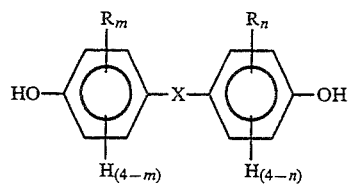

where m and n independently of one another are each integers of from 0 to 4, preferably 0, 1 or 2, particularly preferably 0, R is methyl, methoxy or ethyl, preferably methyl, and X is a chemical bond or a bivalent, aliphatic $C_1$–$C_7$-hydrocarbon, preferably $C_1$–$C_3$-hydrocarbon, or cycloaliphatic $C_5$- or $C_6$-hydrocarbon radical or a bridge member, such as O, S, SO, $SO_2$, CO or —O($CH_2$)$_p$O— in which p is 2–10, preferably 2 or 4, with the proviso that the sum of the aliphatic carbon atoms of all radicals R bonded to a phenol ring is <6, preferably <3.

X is preferably a chemical bond, $C_1$–$C_3$-alkylene, O, S or $SO_2$, particularly preferably —$CH_2$—, —$C(CH_3)_2$— or —$SO_2$—.

Examples of the novel diphenols C) are: dihydroxybiphenyls
bis(hydroxyphenyl)alkanes
bis(hydroxyphenyl)cycloalkanes
bis(hydroxyphenyl) sulfides
bis(hydroxyphenyl) ethers
bis(hydroxyphenyl) ketones
bis(hydroxyphenyl) sulfoxides
bis(hydroxyphenyl-) sulfones and
α,α-bis(hydroxyphenyl)diisopropylbenzenes.

Examples of preferred compounds are:
4,4'-dihydroxybiphenyl, if necessary as a mixture with 2,4'-dihydroxybiphenyl
4,4'-dihydroxy-3,3',5,5'-tetramethylbiphenyl
4,4'-dihydroxy-3,3'-dimethylbiphenyl
bis(4-hydroxyphenyl)methane
bis(4-hydroxy-3,5-dimethylphenyl)methane
bis(4-hydroxyphenyl)ethane
2,2-bis(4-hydroxyphenyl)propane (bisphenol A)
2,2-bis(4-hydroxyphenyl-3,5-dimethylphenyl)propane
2,2-bis(4-hydroxy-3,3'-dimethylphenyl)propane
1,1-bis(4-hydroxyphenyl)cyclohexane
1,1-bis(4-hydroxy-3,5-dimethylphenyl)cyclohexane
bis(4-hydroxyphenyl) sulfone
bis(4-hydroxy-3,3'-dimethylphenyl) sulfone
bis(4-hydroxy-3,3-dimethylphenyl) sulfone
bis(4-hydroxyphenyl) sulfide
bis(4-hydroxy-3,5-dimethylphenyl) sulfide
bis(4-hydroxy-3,5-dimethylphenyl) sulfide
bis(4-hydroxyphenyl) oxide
bis(4-hydroxy-3,5-dimethylphenyl) oxide
bis(4-hydroxyphenyl) ketone
bis(4-hydroxy-3,5-dimethylphenyl) ketone
bis(4-hydroxy-3,5-dimethylphenyl)propane.

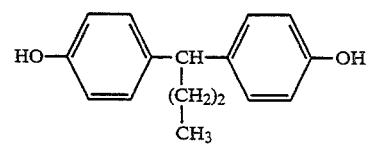

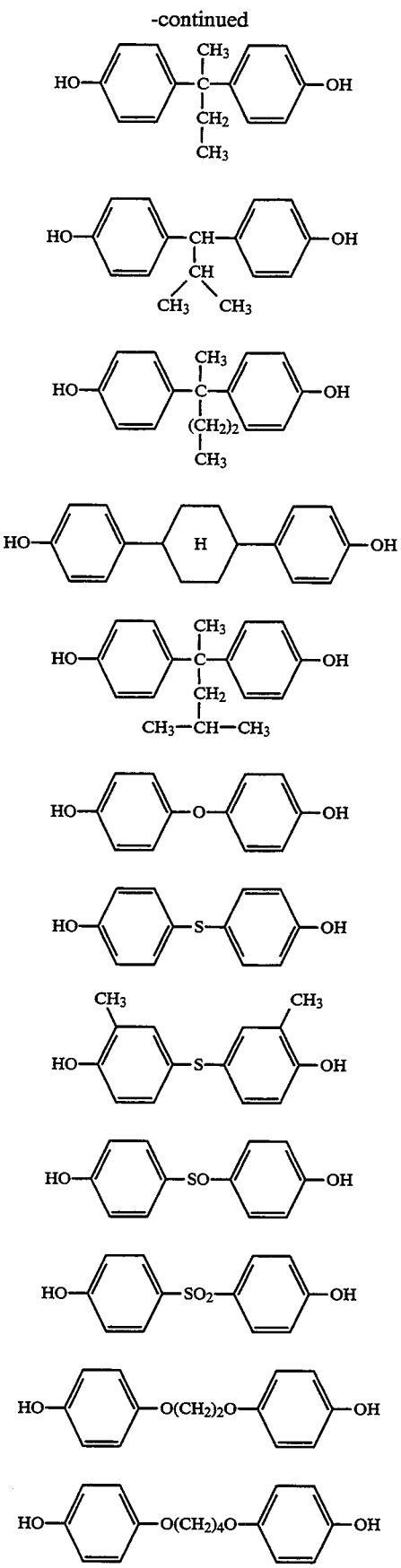

Particularly suitable diphenols are:

bis(4-hydroxyphenyl)methane
bis(4-hydroxy-3,5-dimethylphenyl)methane
2,2-bis(4-hydroxyphenyl)propane
2,2-bis(4-hydroxy-3,5-dimethylphenyl)propane
2,2-bis(4-hydroxy-3,3'-dimethylphenyl)propane
1,1-bis(4-hydroxyphenyl)cyclohexane
bis(4-hydroxyphenyl) sulfone
bis(4-hydroxy-3,5-dimethylphenyl) sulfone
bis(4-hydroxyphenyl) sulfide.

Bis(4-hydroxyphenyl)methane and bis(4-hydroxyphenyl)propane are very particularly preferred.

The last-mentioned products can also be used in their crude form, for example contaminated with the corresponding 2,4-isomers and with small amounts of bisphenols having an indane structure or chroman structure and also the homologous trinuclear trisphenols.

Mixtures of the diphenols and mixtures of mono- and diphenolic compounds I and II can of course also be used.

The novel molding materials may contain, as a further component, from 0 to 60, preferably from 1 to 50, in particular from 10 to 40, very particularly from 20 to 30, % by weight of a fibrous or particulate filler (component (D)) or of a mixture thereof.

Preferred fibrous reinforcing materials (component (D)) are carbon fibers, potassium titanate whiskers, Aramid fibers and particularly preferably glass fibers. When glass fibers are used, they may be provided with a size and an adhesion promoter for better compatibility with the thermoplastic polyamide (A). In general, the glass fibers used have a diameter of from 6 to 20 μm.

These glass fibers may be incorporated both in the form of short glass fibers and in the form of rovings. In the finished injection molding, the mean length of the glass fibers is preferably from 0.08 to 0.5 mm.

Suitable particulate fillers are amorphous silica, magnesium carbonate (chalk), kaolin (in particular calcined kaolin), powdered quartz, mica, talc, feldspar and in particular calcium silicates, such as wollastonite.

Preferred combinations of fillers are, for example, 20% by weight of glass fibers with 15% by weight of wollastonite and 15% by weight of glass fibers with by weight of wollastonite.

The novel thermoplastic molding materials may contain, as component (E), from 0 to 30, preferably from 0.5 to 20, in particular from 1 to 15, % by weight of an elastomeric polymer.

Preferred elastomeric polymers are polymers based on olefins, which are composed of the following components:

e$_1$) 40–100% by weight of at least one α-olefin of 2 to 8 carbon atoms, e$_2$) 0–50% by weight of a diene, e$_3$) 0–45% by weight of a C$_1$–C$_{12}$-alkyl ester of acrylic acid or methacrylic acid or a mixture of such esters, e$_4$) 0–40% by weight of an ethylenically unsaturated mono- or dicarboxylic acid or of a functional derivative of such an acid, e$_5$) 0–40% by weight of an epoxy-containing monomer and e$_6$) 0–5% by weight of other monomers capable of free radical polymerization, with the proviso that component (E) is not an olefin homopolymer.

A first preferred group comprises the ethylene/propylene (EPM) and ethylene/propylene/diene (EPDM)

rubbers, which preferably have a ratio of ethylene to propylene units of from 40:60 to 90:10.

The Mooney viscosities (MLI+4/100° C.) of such, preferably uncrosslinked, EPM and EPDM rubbers (gel contents in general less than 1% by weight) are preferably from 25 to 100, in particular from 35 to 90 (measured using the large rotor after a running time of minutes at 100° C. according to DIN 53 523).

EPM rubbers generally have virtually no more double bonds, whereas EPDM rubbers have from 1 to 20 double bonds per 100 carbon atoms.

Examples of diene monomers $e_2$) for EPDM rubbers are conjugated dienes, such as isoprene and butadiene, nonconjugated dienes of 5 to 25 carbon atoms, such as penta-1,4-diene, hexa-1,4-diene, hexa-1,5-diene, 2,5-dimethylhexa-1,5-diene and octa-1,4-diene, cyclic dienes, such as cyclopentadiene, cyclohexadienes, cyclooctadienes and dicyclopentadiene, and alkenylbornenes, such as 5-ethylidene-2-norbornene, 5-butylidene-2-norbornene, 2-methallyl-5-norbornene or 2-isopropenyl-5-norbornene, and tricyclodienes, such as 3-methyltricyclo[5.2.1.0.2.6]3,8-decadiene, or mixtures thereof. Hexa-1,5-diene, 5-ethylidenenorbornene and dicyclopentadiene are preferred. The diene content of the EPDM rubbers is preferably from 0.5 to 50, in particular from 2 to 20, particularly preferably from 3 to 15, % by weight, based on the total weight of the olefin polymer.

EPM and EPDM rubbers may preferably also be grafted with reactive carboxylic acids or derivatives thereof. Particular examples are acrylic acid, methacrylic acid and derivatives thereof, as well as maleic anhydride.

A further group of preferred olefin polymers comprises copolymers of $\alpha$-olefins of 2 to 8 carbon atoms, in particular of ethylene, with $C_1$-$C_{18}$-alkyl esters of acrylic acid and/or methacrylic acid.

All primary and secondary $C_1$-$C_{18}$-alkyl esters of acrylic acid or methacrylic acid are in principle suitable, but esters of 1 to 12, in particular 2 to 10, carbon atoms are preferred.

Examples of these are methyl, ethyl, propyl, n-butyl, isobutyl, 2-ethylhexyl, octyl and decyl acrylates and the corresponding esters of methacrylic acid. Among these, n-butyl acrylate and 2-ethylhexyl acrylate are particularly preferred.

The amount of methacrylates and acrylates $e_3$) in the olefin polymers is 0–60, preferably 10–50, in particular 30–45, % by weight.

Instead of the esters $e_3$), or in addition to these, the olefin polymers may also contain acid functional and/or latent acid functional monomers of ethylenically unsaturated mono- or dicarboxylic acids $e_4$) or epoxy-containing monomers $e_5$).

Examples of monomers $e_4$) are acrylic acid, methacrylic acid, tertiary alkyl esters of these acids, in particular tert-butyl acrylate, and dicarboxylic acids, such as maleic acid and fumaric acid, or derivatives of these acids and monoesters thereof.

Latent acid functional monomers are understood as meaning compounds which form free acid groups under the polymerization conditions or during incorporation of the olefin polymers into the molding materials. Examples are anhydrides of dicarboxylic acids of up to 20 carbon atoms, in particular maleic anhydride, and tertiary $C_1$-$C_{12}$-alkyl esters of the abovementioned acids, in particular tert-butyl acrylate and tert-butyl methacrylate.

The acid functional or latent acid functional monomers and the epoxy-containing monomers are preferably incorporated in the olefin polymers by adding compounds of the general formulae I–IV

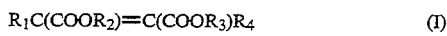

$$R_1C(COOR_2)=C(COOR_3)R_4 \qquad (I)$$

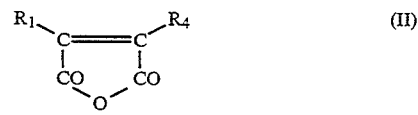

(II)

(III)

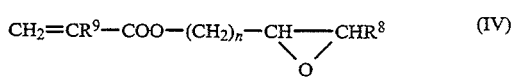

(IV)

where $R^1$ to $R^9$ are each hydrogen or alkyl of 1 to 6 carbon atoms, m is an integer of from 0 to 20 and n is an integer of from 0 to 10.

$R^1$ to $R^7$ are each preferably hydrogen, m is preferably 0 or 1 and n is preferably 1. The corresponding compounds are maleic acid, fumaric acid or maleic anhydride $e_4$) or alkenyl glycidyl ether or vinyl glycidyl ether $e_5$).

Preferred compounds of the formulae I, II, III and IV are maleic acid and maleic anhydride as component $e_4$) and epoxy-containing esters of acrylic acid and/or methacrylic acid, glycidyl acrylate and glycidyl methacrylate (as component $e_5$) being particularly preferred.

The amount of each of components $e_4$) and $e_5$) is from 0.07 to 40, in particular from 0.1 to 20, particularly preferably from 0.15 to 15, % by weight, based on the total weight of the olefin polymers.

Particularly preferred olefin polymers are those consisting of from 50 to 98.9, in particular from 60 to 95, % by weight of ethylene, from 0.1 to 20, in particular from 0.15 to 15, % by weight of glycidyl acrylate and/or glycidyl methacrylate, acrylic acid and/or maleic anhydride and from 1 to 45, in particular from 10 to 35, % by weight of n-butyl acrylate and/or 2-ethylhexyl acrylate.

Further preferred esters of acrylic and/or methacrylic acid are the methyl, ethyl, propyl and isobutyl esters.

Examples of suitable other monomers $e_6$) are vinyl esters and vinyl ethers.

The ethylene copolymers described above can also be prepared by conventional processes, preferably by random copolymerization under high pressure and at elevated temperatures.

The melt flow index of the ethylene copolymers is in general from 1 to 80 g/10 min (measured at 190° C. and a load of 2.16 kg).

In addition to the above preferred elastomeric polymers based on olefins, for example the following polymers are suitable as elastomers (E).

Emulsion polymers whose preparation is described, for example, in Houben-Weyl, Methoden der organischen Chemie, Volume XII.I (1961) and by Blackley in the monograph Emulsion Polymerisation may be primarily mentioned here.

In principle, random elastomers or elastomers having a shell structure may be used. The shell-like structure is determined by the order of addition of the individual monomers.

Examples of monomers for the preparation of the rubber part of the elastomers are acrylates, such as n-butyl acrylate and 2-ethylhexyl acrylate, corresponding methacrylates, butadiene and isoprene and mixtures thereof. These monomers can be copolymerized with further monomers, such as styrene, acrylonitrile, vinyl ethers and further acrylates or methacrylates, such as methyl methacrylate, methyl acrylate, ethyl acrylate and propyl acrylate.

The flexible or rubber phase (having a glass transition temperature below 0° C.) of the elastomers may be the core, the outer shell or a middle shell (in the case of elastomers having a structure comprising more than two shells); in multishell elastomers, a plurality of shells may consist of a rubber phase.

If the elastomer is composed of one or more rigid components (having glass transition temperatures of more than 20° C.) in addition to the rubber phase, said rigid components are generally prepared by polymerizing styrene, acrylonitrile, methacrylonitrile, α-methylstyrene, p-methylstyrene, acrylates and methacrylates, such as methyl acrylate, ethyl acrylate and methyl methacrylate, as main monomers. In addition, relatively small amounts of further comonomers may be used here too.

In some cases, it has proven advantageous to use emulsion polymers which have reactive groups at the surface. Such groups are, for example, epoxy, carboxyl, latent carboxyl, amino or amido groups and functional groups which can be introduced by the concomitant use of monomers of the general formula

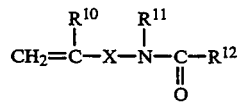

where $R^{10}$ is hydrogen or $C_1$–$C_4$-alkyl, $R^{11}$ is hydrogen, $C_1$–$C_8$-alkyl or aryl, in particular phenyl, $R^{12}$ is hydrogen, $C_1$–$C_{10}$-alkyl, $C_6$–$C_{12}$-aryl or $OR^{13}$ $R^{13}$ is $C_1$–$C_8$-alkyl or $C_6$–$C_{12}$-aryl, each of which may be substituted by O— or N-containing groups, X is a chemical bond, $C_1$–$C_{10}$-alkylene or $C_6$–$C_{12}$-arylene or

Y is O—Z— or NH-Z and Z is $C_1$–$C_{10}$-alkylene or $C_6$–$C_{12}$-arylene.

The graft monomers described in EP-A 208 187 are also suitable for introducing reactive groups at the surface.

Further examples are acrylamide, methacrylamide and substituted esters of acrylic acid or methacrylic acid, such as N-tert-butylaminoethyl methacrylate, N,N-dimethylaminoethyl acrylate, N,N-dimethylaminomethyl acrylate and N,N-diethylaminoethyl acrylate.

The particles of the rubber phase may also be crosslinked. Examples of crosslinking monomers are buta-1,3-diene, divinylbenzene, diallyl phthalate and dihydrodicyclopentadienyl acrylate, as well as the compounds described in EP-A 50 265.

Graft-linking monomers may also be used, ie. monomers having two or more polymerizable double bonds which react at different rates during the polymerization. Preferably used compounds are those in which at least one double bond polymerizes at about the same rate as the other monomers whereas the remaining double bonds polymerize substantially more slowly. The different polymerization rates result in a certain porportion of unsaturated double bonds in the rubber. If a further phase is subsequently grafted onto such a rubber, some or all of the double bonds present in the rubber react with the graft monomers with formation of chemical bonds, ie. the grafted-on phase is partly or completely linked via chemical bonds to the grafting base.

Examples of such graft-linking monomers are allyl-containing monomers, in particular allyl esters of ethylenically unsaturated carboxylic acids, such as allyl acrylate, allyl methacrylate, diallyl maleate, diallyl fumarate, diallyl itaconate or the corresponding monoallyl compounds of these dicarboxylic acids. In addition, there are a large number of further suitable graft-linking monomers; for further details, reference may be made to, for example, U.S. Pat. No. 4,148,846.

In general, the content of these crosslinking monomers in component (E) is up to 5, preferably not more than 3, % by weight, based on (E).

Some preferred emulsion polymers are shown below. First, graft polymers having a core and at least one outer shell and the following structure may be mentioned here:

| Type | Monomers for the core | Monomers for the shell |
|---|---|---|
| E/1 | Buta-1,3-diene, isoprene, n-butyl acrylate, ethylhexyl acrylate or mixtures thereof | Styrene, acrylonitrile, methyl methacrylate |
| E/2 | As for E/1 but with the concomitant use of crosslinking agents | As for E/1 |
| E/3 | As for E/1 or E/2 | n-Butyl acrylate, ethyl acrylate, methyl acrylate, buta-1,3-diene, isoprene, ethylhexyl acrylate |
| E/4 | As for E/1 or E/2 | As for E/1 or E/3 but with the concomitant use of monomers having reactive groups as described herein |
| E/5 | Styrene, acrylonitrile, methyl methacrylate or mixtures thereof | First shell of monomers as described under E/1 and E/2 for the core Second shell as described under E/1 or E/3 for the shell |

Instead of graft polymers having a multishell structure, it is also possible to use homogeneous, ie. one-shell, elastomers of buta-1,3-diene, isoprene and n-butyl acrylate or copolymers thereof. These products too can be prepared by the concomitant use of crosslinking monomers or monomers having reactive groups.

Examples of preferred emulsion polymers are n-butyl acrylate/(meth)acrylic acid copolymers, n-butyl acrylate/glycidyl acrylate or n-butyl acrylate/glycidyl methacrylate copolymers, graft polymers having an inner core of n-butyl acrylate or based on butadiene and an outer shell of the abovementioned copolymers and copolymers of ethylene with comonomers which provide reactive groups.

The elastomers (E) described can also be prepared by further conventional processes, for example by suspension polymerization.

In addition to the essential components A) to C) and, if required, D) and E), the novel molding materials may contain conventional additives and processing assistants. The amount thereof is in general up to 20, preferably up to 10, % by weight, based on the total weight of components (A) to (C).

Examples of conventional additives are stabilizers and antioxidants, heat stabilizers and UV stabilizers, lubricants and mold release agents, dyes and pigments and plasticizers.

Antioxidants and heat stabilizers which may be added to the thermoplastic materials according to the invention are, for example, halides of metals of group I of the Periodic Table, for example sodium, potassium and lithium halides, if necessary in conjunction with copper(I) halides, for example chlorides, bromides or iodides. Zinc fluoride and zinc chloride may also be used. Sterically hindered phenols, hydroquinones, substituted members of this group and mixtures of these compounds may also be employed, preferably in concentrations of up to 1% by weight, based on the weight of the mixture.

Examples of UV stabilizers are various substituted resorcinols, salicylates, benzotriazoles and benzophenones, which are used in general in amounts of up to 2% by weight.

Lubricants and mold release agents, which as a rule are added in amounts of up to 1% by weight of the thermoplastic material, are stearic acid, stearyl alcohol, alkyl stearates and stearamides, as well as esters of pentaerythritol with long-chain fatty acids. Salts of calcium, of zinc or of aluminum with stearic acid and dialkyl ketones (Stearon ® from Henkel) may also be used.

The additives include stabilizers which prevent the decomposition of the red phosphorus in the presence of moisture and atmospheric oxygen. Examples are compounds of cadmium, of zinc, of aluminum, of tin, of magnesium, of manganese and of titanium. Particularly suitable compounds are, for example, oxides of the stated metals, as well as carbonates, basic carbonates or hydroxides and salts of organic or inorganic acids, such as acetates or phosphates or hydrogen phosphates.

The novel thermoplastic molding materials can be prepared by conventional processes, by mixing the starting components in a conventional mixing apparatus, such as an extruder, a Brabender mill or Banbury mill, and then extruding the mixture. After extrusion, the extrudate is cooled and comminuted.

The novel materials can also be prepared by a pultrusion process as described in EP-A-56 703. The glass roving is impregnated with the polymer material and then cooled and comminuted. The glass fiber length in this case is identical to the granule length and is from 3 to 20 mm.

The novel molding materials have good mechanical properties.

In addition, they have good flame resistance and creep resistance and very good phosphorus stability.

Because of this property spectrum, the moldings produced from the novel molding materials are particularly suitable for electrical and electronic components, for example electric motor parts (motor protection switches and power contactors), electrical heating apparatuses or housing parts for high voltage switches.

Glass fiber-reinforced moldings are used in particular as plugs, plug connectors or cable jacks in the telecommunications sector.

EXAMPLES

The following components were used for the preparation of the novel molding materials:

Component A/1

Nylon 6.6 (polyhexamethyleneadipamide) having a vicosity number of 151 ml/g, corresponding to a relative viscosity $\eta_{rel}$ of 2.7 (measured in 96% strength by weight $H_2SO_4$ as a 0.5% strength by weight solution according to ISO 307).

Component A/2

A partly aromatic copolyamide composed of $A_1$) 70% by weight of units which are derived from terephthalic acid and hexamethylenediamine and $A_2$) 30% by weight of units which are derived from ε-caprolactam.

The viscosity number according to ISO 307 was 141 ml/g (measured in 96% strength by weight $H_2SO_4$ as a 0.5% strength by weight solution at 25° C.).

Component B

Red phosphorus having a median particle size ($ds_{50}$) of 45 μm.

Component C/1

4-Butylphenol

Component C/2

Bisphenol A (2,2-bis(4-hydroxyphenyl)propane)

Component D

Glass fibers having a mean diameter of 10 μm.

Component E

An olefin polymer of
60% by weight of ethylene
35% by weight of n-butyl acrylate
4.3% by weight of acrylic acid
0.7% by weight of maleic anhydride
having an MFI of 10 g/10 min at 190° C. and a load of 1.16 kg.

Component F

Zinc oxide

Preparation of the molding materials

Components A) to F) were compounded in a twin-screw extruder (120 rpm; 30 kg/h) at from 280° to 330° C., the mixture was extruded and the extrudate was cooled in a water bath and granulated. The granules were dried at 80° C. under reduced pressure and processed on an injection molding machine at 280° C. to give standard test specimens.

The fire behavior was tested according to UL 94 using 1/16 inch bars.

To measure the phosphorus stabilities, test specimens were left in a water bath at 60° C., a sample being taken after 14, 30 and 50 days to determine the water-soluble phosphorus compounds by means of AAS.

The creep resistance (CTI) was determined according to DIN 112, ASTU-D 3638, the modulus of elasticity according to DIN 53,457 and the impact strength according to DIN 53,453.

The composition of the molding materials and the results of the measurements are shown in the Table.

TABLE

| Example | 1* | 2 | 3 | 4* | 5 | 6 | 7 | 8* | 9 |
|---|---|---|---|---|---|---|---|---|---|
| | 68 A/1 | 64 A/1 | 64 A/1 | 68.3 A/1 | 64.3 A/1 | 62.3 A/1 | 58.3 A/1 | 62.3 A/2 | 58.3 A/2 |
| | 7 B | 7 B | 7 B | 6 B | 6 B | 6 B | 6 B | 6 B | 6 B |
| | — | 4 C/2 | 4 C/1 | — | 4 C/2 | — | 4 C/2 | — | 4 C/2 |
| | 25 D | 25 D | 25 D | 25 D | 25 D | 25 D | 25 D | 25 D | 25 D |

TABLE-continued

| Example | 1* | 2 | 3 | 4* | 5 | 6 | 7 | 8* | 9 |
|---|---|---|---|---|---|---|---|---|---|
| | — | — | — | — | — | 6 E | 6 E | 6 E | 6 E |
| | — | — | — | 0.7 F | 0.7 F | 0.7 F | 0.7 F | 0.7 F | 0.7 F |
| UL 94 (1/16″) | VO | VO | VO | VO | VO | VO | VO | VO | VO |
| Rate of loss of P: | | | | | | | | | |
| ppm of P | | | | | | | | | |
| after 14 d | 70 | 52 | 58 | 42 | 15 | 35 | 13 | 5 | <1 |
| after 30 d | 150 | 103 | 111 | 72 | 34 | 63 | 25 | 10 | 4 |
| after 50 d | 300 | 213 | 225 | 120 | 52 | 97 | 33 | 15 | 7 |
| E modulus (N/mm$^2$) | 8700 | 9000 | 8800 | 8600 | 8800 | 8500 | 8800 | 8600 | 8600 |
| impact strength (kJ/m$^2$) | 41 | 42 | 40 | 30 | 31 | 37 | 40 | 45 | 47 |
| CTI (volt) | 600 | 600 | 600 | 500 | 500 | 600 | 600 | 600 | 600 |

*For comparison

We claim:

1. A flameproofed thermoplastic molding material containing
A) 30–98% by weight of a thermoplastic polyamide,
B) 1–30% by weight of red phosphorus,
C) 1–15% by weight of a phenolic compound selected from the group consisting of a monophenol of not less than 10 carbon atoms of the formula

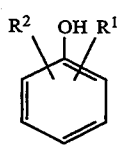

where $R^1$ and $R^2$ are identical or different and are each hydrogen, $C_1$–$C_{16}$-alkyl, $C_6$–$C_{18}$-aryl or $C_7$–$C_{20}$-aralkyl, where each of the radicals may be substituted by at least one $C_1$–$C_{12}$-alkyl group or one halogen atom and the aryl radical may be bonded via —O—, -$C_1$–$C_3$-alkylene- or —SO$_2$— bridge members, or $R^1$ and $R^2$ are bonded to one another to form an aromatic or cycloaliphatic carbocyclic ring, with the proviso that both radicals $R^1$ and $R^2$ may not be ortho to the phenolic OH group;

a diphenol of the formula II

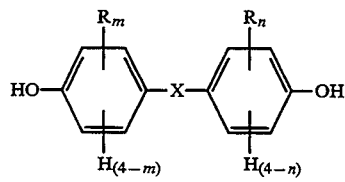

where R is CH$_3$, CH$_3$—O— or C$_2$H$_5$—, m and n independently of one another are each an integer of from 0 to 4, and X is a chemical bond, $C_1$–$C_7$-alkylene, $C_5$- or $C_6$-cycloalkylene, O, S, SO, SO$_2$, CO or O—(CH$_2$)$_p$—O— in which p is 2–10, With the proviso that the sum of the aliphatic carbon atoms of all radicals R bonded to a phenol ring is >6; or mixtures thereof, D) 0–60% by weight of a fibrous or particulate filler or of a mixture thereof and
E) 0–30% by weight of an elastomeric polymer.

2. A flameproofed thermoplastic molding material as claimed in claim 1, containing, as component C), a monophenol of not less than 10 carbon atoms of the formula I

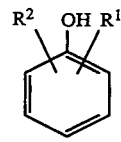

where $R^1$ and $R^2$ are identical or different and are each hydrogen, $C_1$–$C_{16}$-alkyl, $C_6$–$C_{18}$-aryl or $C_7$–$C_{20}$-aralkyl, where each of the radicals may be substituted by at least one $C_1$–$C_{12}$-alkyl group or one halogen atom and the aryl radical may be bonded via —O—, -$C_1$–$C_3$-alkylene- or —SO$_2$— bridge members, or $R^1$ and $R^2$ are bonded to one another to form an aromatic or cycloaliphatic carbocyclic ring, with the proviso that both radicals $R^1$ and $R^2$ may not be ortho to the phenolic OH group.

3. A flameproofed thermoplastic molding material as claimed in claim 1, containing, as component C), a diphenol of the formula II

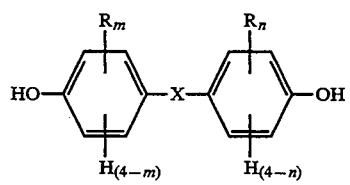

where R is CH$_3$—, CH$_3$—O— or C$_2$H$_5$—, m and n independently of one another are each an integer of from 0 to 4, and X is a chemical bond, $C_1$–$C_7$-alkylene, $C_5$- or $C_6$-cycloalkylene, O, S, SO, SO$_2$, CO or O—(CH$_2$)$_p$—O— in which p is 2–10, with the proviso that the sum of the aliphatic carbon atoms of all radicals R bonded to a phenol ring is <6.

4. A flameproofed thermoplastic molding material as claimed in claim 1, containing
40–97% by weight of A),
1–30% by weight of B),
1–12% by weight of C) and
1–50% by weight of D).

5. A flameproofed thermoplastic molding material as claimed is claim 1, containing, as component A), a partly aromatic, semicrystalline copolyamide having a triamine content of less than 0.5% by weight and based on (A$_1$) 20–90% by weight of units which are derived from terephthalic acid and hexamethylenediamine,
(A$_2$) 0–50% by weight of units which are derived from ε-caprolactam, (A₃) 0–80% by weight of units which are derived from adipic acid and hexamethylenediamine and (A₄) 0–40% by weight of further polyamide-forming monomers, the amount of components (A₂) or (A₃) or (A₄) or of mixtures thereof being at least 10% by weight.

6. A flameproofed thermoplastic molding material as claimed in claim 1, containing, as monophenolic compound C), tetrahydronaphthol, 2-butylphenol (sec or tert), 4-tert-butylphenol, thymol, 4-tert-pentylphenol, octylphenol (mixture), nonylphenol (mixture), dodecylphenol (mixture), 4-hydroxybiphenyl, 2-hydroxybiphenyl, alkyl-substituted hydroxybiphenyls, 1-naphthol, 2-naphthol, benzylphenol(s), benzylcresol(s), 2-phenyl-2-(4-hydroxyphenyl)-propane, 4-hydroxydiphenyl sulfone, 4-hydroxydiphenyl ether, 2- or 4-cyclohexylphenols or mixtures thereof.

7. A flameproofed thermoplastic molding material as in claim 1, containing a diphenolic compound C) in which R is methyl, m and n are each from 0 to 2 and X is —CH₂—, —C(CH₃)₂— or —SO₂—.

8. A molding obtainable from a flameproofed thermoplastic molding material as claimed in claim 1.

* * * * *

UNITED STATES PATENT AND TRADEMARK OFFICE
CERTIFICATE OF CORRECTION

PATENT NO.: 5,434,209

DATED: July 18, 1995

INVENTOR(S): GAREISS et al.

It is certified that error appears in the above-identified patent and that said Letters Patent is hereby corrected as shown below:

Column 15, claim 1, line 58, "With" should read --with--.

Column 15, claim 1, line 60, ">" should read --<--.

Column 18, claim 7, line 6, after "material as" insert --claimed--.

Signed and Sealed this

Twenty-sixth Day of September, 1995

Attest:

BRUCE LEHMAN

*Attesting Officer*           *Commissioner of Patents and Trademarks*